July 2, 1946.  A. J. BANNING  2,403,328
HYDRAULIC MECHANISM
Filed March 28, 1944
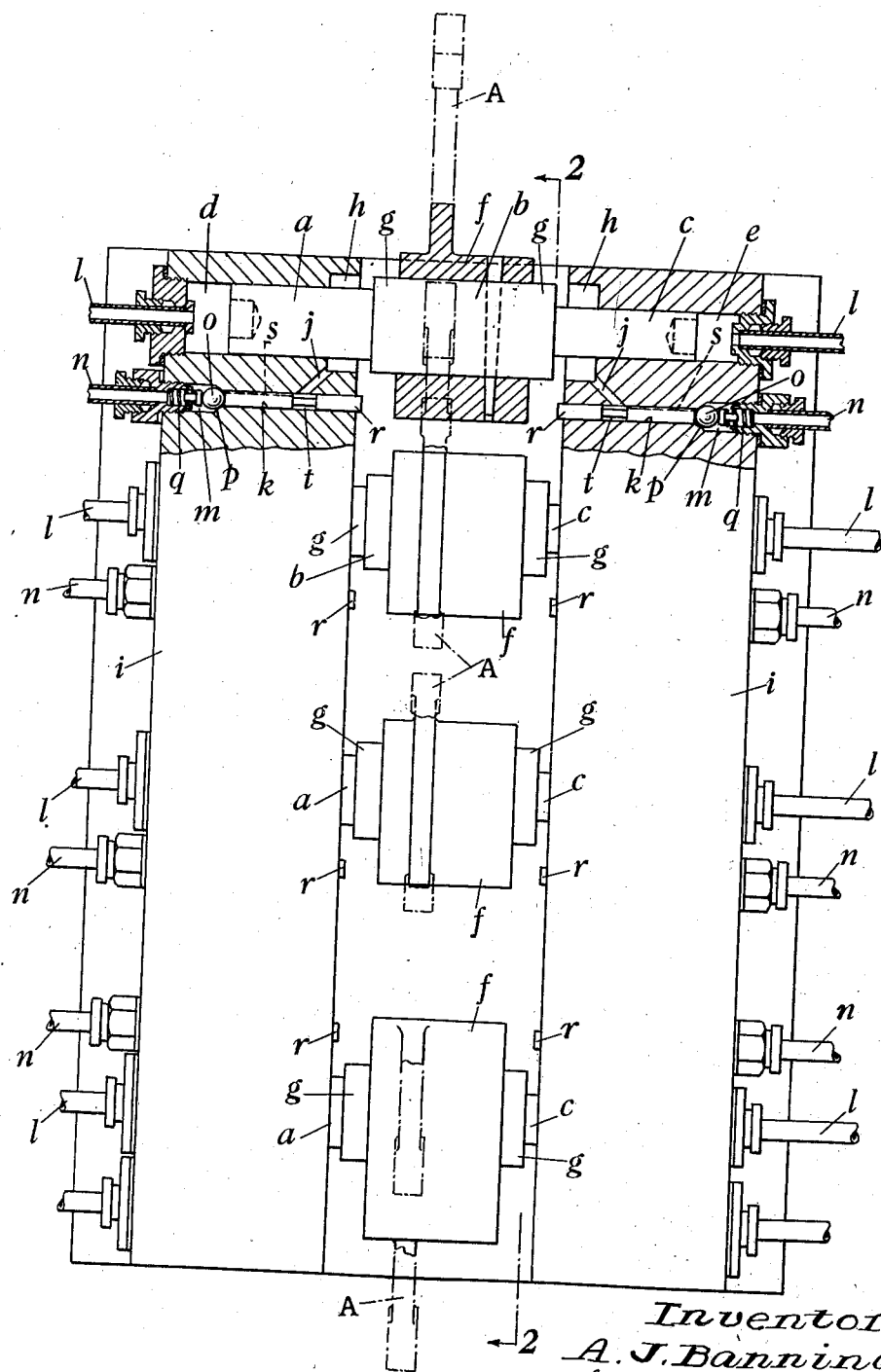
Inventor
A. J. Banning
By Joseph Downing Seebla
Attys Patented July 2, 1946

2,403,328

UNITED STATES PATENT OFFICE 2,403,328

HYDRAULIC MECHANISM

Alfred James Banning, Coventry, England, assignor to A. C. Wickman Limited, Coventry, England Application March 28, 1944, Serial No. 528,441
In Great Britain May 14, 1943

3 Claims. (Cl. 121—38)

This invention relates to hydraulic mechanisms of the reciprocatory plunger type. When such a mechanism is employed for actuating a clutch, brake, or other analogous mechanism it is desirable, in some cases, to oppose the force exerted by the plunger at the end of its stroke on the mechanism actuated by it, without relieving the hydraulic pressure acting on the plunger. For example, a known form of hydraulic mechanism used for actuating a multi-plate friction clutch through the medium of a toggle device, consists of a plunger having two end parts of different diameters. These two parts occupy a pair of cylinders of corresponding diameters. The two cylinders are connected to a fluid supply system in which operating fluid is maintained at a constant pressure by a pump. The smaller cylinder is in constant communication with the system, and the larger cylinder is connectible to either the system or a sump through a valve. On the intermediate portion of the plunger is secured an arm which engages a rotary and slidable clutch operating member. To bring the clutch into action the said valve is opened to the sump, and the fluid pressure constantly acting on the smaller end of the plunger causes the latter to actuate the clutch operating member. At the end of this operation the force transmitted from the plunger through the arm is maintained, and consequently undesirable friction is maintained between the arm and the member which it engages. The object of the present invention is to enable this force to be opposed in a simple and effective manner.

In the example above described, the plunger is moved in the opposite direction by causing the valve to put the larger cylinder in communication with the fluid supply system. The pressure exerted on the larger end of the plunger is then sufficient to overcome the pressure acting on the smaller end and so cause the arm to move the clutch operating member in the opposite direction. This movement may be utilised to actuate another clutch, and here again the same condition arises, that at the end of the movement the force transmitted from the plunger involves continued undesirable friction between the arm and the part with which it engages.

The accompanying drawing is a part sectional side elevation of hydraulic mechanism constructed in accordance with the invention for imparting sliding movements in opposite directions to a plurality of clutch-actuating arms.

In the drawing the slidable clutch-actuating arms are indicated by A.

In applying the invention as shown to each of the clutch-actuating arms A, I employ a plunger (hereinafter termed a compound plunger) having three integral parts $a$, $b$, $c$ of unequal diameters, the intermediate part $b$ being of larger diameter than the end parts $a$, $c$. The two end parts $a$, $c$ form principal plungers which slide respectively in principal cylinders $d$, $e$. The arm A is secured on the intermediate part $b$ by a boss $f$ from opposite ends of which short end portions $g$ of the intermediate part project, these end portions forming a pair of secondary force-opposing plungers. Also in each of the two adjacent ends of the two principal cylinders $d$, $e$ is formed a short cylindrical recess $h$ forming a secondary force-opposing cylinder and adapted to receive the corresponding plunger $g$. When the arm A is in its central position as shown in Figure 1, both secondary plungers $g$ are clear of their cylinders $h$. The principal cylinders $d$, $e$ and the corresponding secondary cylinders $h$ are formed respectively in a pair of cylinder blocks $i$ arranged parallel with each other, and are adapted for connection by pipes $l$ to a constant-pressure fluid supply system.

Each secondary cylinder $h$ communicates through a short passage $j$ with a bore $k$ formed in the corresponding block $i$ parallel to the cylinder axis. At its outer end the bore $k$ terminates in a valve chamber $m$ which is adapted for connection by a pipe $n$ to the constant-pressure fluid supply system. The chamber $m$ contains a valve which may consist of a ball $o$ adapted to co-operate with a seating $p$ at the inner end of the chamber for interrupting communication between the chamber and the bore $k$. Normally the valve $o$ is held on its seating $p$ by a spring $q$. For moving the valve $o$ off its seating $p$ against the action of the spring $q$ I provide a push rod $r$ which is slidable in the bore $k$ and abuts at one end against the valve. The other end of this push rod $r$ projects beyond the inner face of the corresponding cylinder block $i$ and is so located that when the arm A on the plunger part $b$ very nearly approaches the end of its travel, it moves the rod sufficiently to open the valve $o$ and so allow pressure fluid to enter the corresponding secondary cylinder $h$ which is now occupied by its plunger $g$, the push rod being formed with a longitudinal groove $s$ and an annular recess $t$ through which pressure fluid can flow from the valve chamber $m$ to the passage $j$ leading to the secondary cylinder when the valve is open.

The mode of action of the example above described is as follows:

Let it be supposed that the compound plunger $a$, $b$, $c$ is being moved by the fluid pressure acting on the outer end of the smaller principal plunger c. During the travel of the compound plunger one of the secondary plungers g enters the secondary cylinder h associated with the larger end of the compound plunger. When the compound plunger approaches the end of its travel the arm A engages the adjacent push rod r and opens the corresponding valve o, thereby allowing pressure fluid to enter the associated secondary cylinder h through the adjacent groove s and passage j. This enables pressure fluid to exert an opposing force on the larger part and effect a slight reverse movement of the compound plunger a, b, c, sufficient to enable the valve o to re-close. The restriction to the flow of pressure fluid imposed by the groove s ensures completion of the stroke of the principal plunger c before the slight reverse movement of the compound plunger is effected. In this condition the pressure which would otherwise exist between the arm A and the associated clutch-operating member is relieved.

A similar action occurs when the compound plunger a, b, c is moved in the opposite direction. Pressure fluid now acts on the larger end of the compound plunger so that the latter can move in opposition to the pressure acting on the smaller end. During the travel, the other secondary plunger g enters the other secondary cylinder h, and when the compound plunger approaches the end of its travel, the other side of the arm A presses against the other push rod r, causing pressure fluid to be admitted to the last mentioned secondary cylinder.

It will, of course, be understood that the invention is not limited to either the example or the specific purpose above described, as it may be applied to other analogous uses, and constructional details may be varied to suit different requirements. In the above example I have described an arrangement involving a double-action plunger, but the invention is equally applicable to an arrangement requiring only a single-action plunger. Also in the said example, the force-opposing device is formed integrally with the operating cylinders and plungers, but in some cases it may be preferable to construct the device as a separate unit adapted to be connected either rigidly or through a lever or the like to the operating plunger to be controlled.

Having thus described my invention what I claim as new and desire to secure by Letters Patent is:

1. Hydraulic mechanism of the kind specified, comprising in combination a pair of principal plungers having different diameters and formed by opposite end portions of a compound plunger, a pair of principal cylinders in which the principal plungers are respectively slidable, a pair of secondary plungers formed by intermediate portions of the compound plunger, a pair of secondary cylinders at adjacent ends of the principal cylinders and adapted to receive the secondary plungers, valves for admitting pressure fluid to the secondary cylinders, and means responsive to movements of the compound plunger for automatically opening the valves so that when the compound plunger approaches the end of its travel in either direction pressure fluid is admitted to the secondary cylinder at the leading end of the compound plunger for opposing the force exerted by the latter plunger.

2. Hydraulic mechanism as claimed in claim 1, in which the means for opening the valves comprise push rods operable by the compound plunger.

3. Hydraulic mechanism of the kind specified, comprising the combination with a principal cylinder and plunger, and a movable member to which an operative force can be imparted by relative movement of the principal cylinder and plunger under the action of fluid pressure, of a secondary cylinder and plunger adapted under the action of fluid pressure to oppose the operative force exerted on the said member, the secondary cylinder being formed by a recessed end of the principal cylinder, and the secondary plunger being of larger diameter than the principal plunger and forming therewith a compound plunger, a valve for admitting pressure fluid to the secondary cylinder, and means responsive to relative movement of the principal cylinder and plunger for automatically opening the valve when the said member has been moved to a predetermined extent by the said force.

ALFRED JAMES BANNING.